Patented Mar. 14, 1939

2,150,236

UNITED STATES PATENT OFFICE 2,150,236

PROCESS FOR MAKING TITANIUM PIGMENTS

Robert M. McKinney, Roselle, Del., assignor to E. I. du Pont de Nemours & Company, Wilmington, Del., a corporation of Delaware No Drawing. Application November 2, 1937, Serial No. 172,378

13 Claims. (Cl. 134—58)

This invention relates to improvements in the manufacture of titanium oxide pigments. More particularly it relates to improvements in the wet grinding of titanium oxide pigments. Still more particularly it relates to the preparation of dispersed suspensions of titanium oxide pigments.

Titanium pigments are usually manufactured from ilmenite by the sulfuric acid process. In such a process the ore is dissolved by the aid of sulfuric acid and the solution after purification treatments is hydrolyzed by boiling under proper closely controlled conditions. The precipitated pigment is then separated from the waste acid and is subsequently calcined. Such a calcined pigment is coarse and is unsuitable for commercial use unless well ground. U. S. Patent 1,937,037 discloses an elutriation process whereby a titanium pigment of improved texture is produced. In this patent the patentee discloses the use of NaOH, KOH, NH$_4$OH, Na$_2$SiO$_3$, Na$_2$CO$_3$, and Na$_3$PO$_4$ as dispersing agents. This group of agents has proven to be quite satisfactory in the separation of the finer from the coarser fraction. However, certain disadvantages which have subsequently been discussed in this specification have been found to be present when such agents are employed.

This invention has as an object the improvement of the wet grinding process for titanium oxide pigments. A further object is the production of a titanium oxide pigment of fine texture which can readily be incorporated in paint and enamel vehicles. A still further object is the production of a titanium pigment of reduced water sensitivity. A still further object is the preparation of a highly dispersed titanium pigment suspension. Additional objects will become apparent from a consideration of the following disclosure and claims.

These objects are attained according to the herein described invention which broadly comprises wet grinding calcined titanium pigments in the presence of a small amount of an alkali aluminate. In a more restricted sense this invention comprises wet grinding titanium pigments in the presence of between about 0.05% and about 2%, based on said pigment, of an alkali aluminate. The preferred embodiment of this invention comprises conducting the wet grinding process for titanium pigment in the presence of between about 0.1% and about 0.7%, based on said pigment, of an alkali aluminate, preferably sodium aluminate.

In carrying out my herein described invention I prefer to use the continuous closed circuit wet grinding system. In this process the alkali aluminate reagent has been found superior to the reagents disclosed in the prior art. The suspension is extremely free of flocculates and this results in hydroseparation in a most efficient manner.

The closed circuit wet grinding system may be operated in different ways depending upon the character of the pigment being ground. For instance, when using a coarse hard feed material, the pigment is first fed into a continuous ball mill and the mill discharged to a hydroseparator. The fines can then overflow and the coarse is drawn from the bottom of the hydroseparator and returned to the mill for further grinding. When the pigment to be ground is soft and contains a larger amount of fines it is best to feed it to the hydroseparator first and only the coarse underflow is then fed to the ball mill. Regardless of the mode of operating the system, the dispersing agent should be added to the pigment suspension prior to its introduction into the hydroseparator. I prefer to add it as a solution at the point where the calcined pigment is first suspended in the water.

This invention may more readily be understood by an examination of the following examples which examples are given merely for illustrative purposes and are not intended to place limitations of any kind on the herein described invention.

Example I 7.6 grams of commercial sodium aluminate were dissolved in 100 cc. of water and filtered. 0.63 cc. of the resulting clear solution was added to 400 cc. of pigment slurry containing 125 grams of calcined TiO$_2$ per liter. This suspension was ball milled for 2 hours in a porcelain quartz mill containing 750 grams of flint pebbles. At the end of 8 hours, the dispersion of TiO$_2$ was found to be complete. The pH of such a mixture is only 7.8. On the other hand, when a comparable test was made using sodium hydroxide instead of sodium aluminate, it was found that only very incomplete dispersion was obtained even at a pH as high as 8.4, while a pH of approximately 9.4 is required for dispersion comparable to that obtained with sodium aluminate in the above example. The advantage in decreased corrosion of equipment due to the lower pH for 100% dispersion allowed by the use of sodium aluminate is evident.

*Example II*

A closed circuit wet grinding system consisting of a ball mill containing 56 pounds of flint pebbles, feeding into a hydroseparator, from which the underflow was returned to the ball mill, while the overflow was collected separately, was operated in the following manner: 600 cc. of water and 214 grams of calcined titanium oxide were added per minute. The system was dispersed by means of 38 grams per liter sodium aluminate solution, 31.2 cc. per minute, or the equivalent of 0.56% $NaAlO_2$ on a pigment weight basis. The pH of this mixture was 11.5. When other dispersing agents, such as sodium hydroxide and sodium phosphate, are used, the pH of the slurry must be kept below about 10.5, in order to avoid coagulation of the titanium pigment and therefore, incomplete separation of ground and unground particles in the elutriation process.

It is understood that the herein described invention may vary widely without departing from the scope of this invention. For instance, although sodium aluminate is the preferred agent because of the superior results obtained by its use, other alkali aluminates such as lithium aluminate and potassium aluminate may be employed. Furthermore, it is to be understood that a mixture of two or more alkali aluminates may be used as the dispersing agent. While I prefer to add the aluminate salt as a solution because of control reasons, it is understood that it may also be added as a solid. Also, it can be added to the dry pigment before addition to the water. When such an addition is made and the product mixed, it can readily be dispersed in water and is then suitable for use in the elutriation or hydroseparation process.

The addition of the dry sodium aluminate to previously ground titanium oxide in the powder state gives a product which disperses in water to give an extremely slow settling pigment suspension. Suspensions prepared in this manner are particularly useful in water paints, paper coatings, etc.

This invention may also be applied to extended titanium pigments such as those containing $BaSO_4$ as well as to the pure titanium oxide pigment. The term "titanium oxide containing pigments" as used herein includes the pure oxide pigment as well as the extended titanium pigments.

In comparing the results to be obtained by alkali aluminate with other reagents, I use a very simple test. A sample of the pigment suspension is placed in a glass tube having a diameter of 20 to 30 millimeters and the tube examined by aid of a high intensity microscope lamp and a 10–15 power magnifying glass. Flocculates can be observed under such conditions even when present to only a small extent. The sodium aluminate dispersed pigment is free of flocculates and in this respect at least equals the best results obtained by NaOH, $Na_2SiO_3$, and other reagents without the disadvantages which are present when such prior art reagents are used.

The pH value of a $TiO_2$ suspension containing $NaAlO_2$ as the dispersing agent is lower than a similar suspension containing an equivalent amount of NaOH. I have further found that when the minimum amount of these reagents, necessary to give a flocculate free suspension, is used, the pH is lower for the aluminate treated sample. This has a definite advantage as less chemical corrosion is encountered. I have found complete deflocculation to be effected at a pH of 7.8 when using aluminate while a pH of 9.4 was required for caustic under the same conditions. This corrosion is especially bad if alkaline attacked materials of construction such as aluminum are used.

Sodium aluminate has another advantage over caustic soda. One is allowed to use much larger quantities than are necessary for complete dispersion without danger of coagulation. I may add a quantity that will give a pH above 11.0 without encountering trouble whereas with caustic soda, danger of coagulation exists when the pH exceeds 10.0. Thus, the aluminate acts as a most efficient reagent.

Caustic soda, caustic potash and silicate of soda have been commercially employed prior to my discovery of the effectiveness of the alkali aluminates, especially sodium aluminate. These reagents work well in commercial operations for extended periods of time but occasionally something happens which causes flocculation in the hydroseparators and the system no longer functions. Undue hardness of the water or the presence of a very small amount of calcium oxide or like material in the calcined pigment has been found to produce such an effect. When such conditions prevailed in the past a more effective dispersing agent must be used and sodium silicate was the chosen agent. The continuous use of silicate would avoid these troublesome periods, but the silicate treated pigment is definitely inferior for certain uses. The dry pigment contains silica which acts as a cementing agent thereby causing a gritty product. This silica also causes the resulting paint to be water sensitive and difficult to mix, especially in humid weather. My investigations have shown that the aluminate dispersions have a resistance to these abnormal flocculations comparable to silicate dispersions. Furthermore, the finished pigment does not have this silicate cementing agent present and as a result is of a finer texture and freer of grit. Also, paints containing this pigment are non-water sensitive as compared to silicate treated pigments. In short, the aluminate reagent has the virtues of the silicate reagent with none of its disadvantages.

As compared to caustic soda (or potash) it is a more foolproof reagent due to its resistance to the unwanted premature flocculation mentioned above. Furthermore suspensions which are dispersed with aluminate have been found to be less corrosive than those containing the stronger alkalies.

I have found that my aluminate dispersed suspensions can quite effectively and cheaply be flocculated by the addition of carbon dioxide which as carbonic acid reacts with the alkali forming the alkali metal carbonate or bicarbonate. The carbonic acid acts as a neutralizing agent and this causes loss of dispersion. In this state it is an easily filtered flocculated suspension. The pigment can be washed to remove carbonates if desired prior to drying. The resulting pigment has been found to impart excellent weathering characteristics to paints and is superior in these respects to pigments ground and finished in the presence of the prior art dispersing agents.

Other flocculating agents can also be used. For instance, calcium sulfate, sulfuric acid, strontium sulfate, magnesium chloride and magnesium sulfate have been found quite effective. The use of salts such as calcium sulfate and strontium sulfate, which are only slightly soluble, are desirable for the reason that they flocculate the dispersion without a lowering of the pH value. The suspension can then be washed to remove the dispersing agent and the pigment is thereby freed of the undesirable salts and without a lowering of the alkalinity of this pigment. The resulting pigment after drying has been found to have excellent mixing properties when preparing oil paints. It readily mixes with the oil as it is more readily wetted by oils than prior art products.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for the production of improved titanium pigments which comprises wet grinding calcined titanium pigments in the presence of a small amount of an alkali aluminate.

2. A process for the production of improved titanium pigments which comprises wet grinding calcined titanium pigments in the presence of between about 0.05% and about 2%, based on said pigment, of an alkali aluminate.

3. A process for the production of improved titanium pigments which comprises wet grinding calcined titanium pigments in the presence of a small amount of an alkali aluminate selected from the class consisting of sodium aluminate, lithium aluminate, and potassium aluminate.

4. A process for the production of improved titanium pigments which comprises wet grinding calcined titanium pigments in the presence of between about 0.05% and about 2%, based on said pigment, of an alkali aluminate selected from the class consisting of sodium aluminate, lithium aluminate, and potassium aluminate.

5. A process for the production of improved titanium pigments which comprises mixing a calcined titanium pigment with between about 0.1% and about 0.7%, based on said pigment, of sodium aluminate and grinding such mixture in a continuous close circuit wet grinding system.

6. A process for the production of an improved titanium pigment which comprises wet grinding a mixture of a titanium pigment and an aqueous solution of a small amount of an alkali metal aluminate.

7. A process for the production of an improved titanium pigment which comprises wet grinding a mixture of a titanium pigment and an aqueous solution of a small amount of an alkali metal aluminate selected from the class consisting of sodium aluminate, lithium aluminate, and potassium aluminate.

8. A process for the production of an improved titanium pigment which comprises wet grinding a mixture of a titanium pigment and an aqueous solution of between about 0.05% and about 2%, based on said pigment, of an alkali metal aluminate selected from the class consisting of sodium aluminate, lithium aluminate, and potassium aluminate.

9. A process for the production of an improved titanium pigment which comprises wet grinding a mixture of a titanium pigment and an aqueous solution of between about 0.1% and about 0.7%, based on said pigment, of sodium aluminate and grinding such mixture in a continuous close circuit wet grinding system.

10. An improved pigment possessing the properties of fine texture, reduced water sensitivity, and high dispersibility which comprises an intimate mixture of a titanium pigment and a small amount of an alkali aluminate.

11. An improved pigment possessing the properties of fine texture, reduced water sensitivity and high dispersibility which comprises an intimate mixture of a titanium pigment and a small amount of an alkali metal aluminate selected from the class consisting of sodium aluminate, lithium aluminate, and potassium aluminate.

12. An improved pigment possessing the properties of fine texture, reduced water sensitivity, and high dispersibility which comprises an intimate mixture of a titanium pigment and between about 0.05% and about 2%, based on said pigment, of an alkali metal aluminate selected from the class consisting of sodium aluminate, lithium aluminate, and potassium aluminate.

13. An improved pigment possessing the properties of fine texture, reduced water sensitivity and high dispersibility which comprises an intimate mixture of a titanium pigment and between about 0.1% and about 0.7%, based on said pigment, of sodium aluminate.

ROBERT M. McKINNEY.